(12) United States Patent
Crane

(10) Patent No.: US 7,559,722 B2
(45) Date of Patent: Jul. 14, 2009

(54) METHOD AND APPARATUS FOR PIPE REFORMING AND CLEARING

(75) Inventor: Robert F. Crane, Oconomowoc, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 164 days.

(21) Appl. No.: 11/698,464

(22) Filed: Jan. 26, 2007

(65) Prior Publication Data

US 2008/0181727 A1    Jul. 31, 2008

(51) Int. Cl.
*F16L 55/18* (2006.01)
(52) U.S. Cl. .................. 405/184.3; 405/156; 138/97
(58) Field of Classification Search .............. 405/184.3, 405/156, 184.1; 138/97
See application file for complete search history.

(56) References Cited

U.S. PATENT DOCUMENTS

| 4,738,565 | A | | 4/1988 | Streatfield et al. | ........... 405/154 |
|---|---|---|---|---|---|
| 4,789,268 | A | * | 12/1988 | Yarnell | ..................... 405/184.3 |
| 4,848,964 | A | * | 7/1989 | Yarnell | ..................... 405/184.3 |
| 5,076,730 | A | * | 12/1991 | Bergey | ..................... 405/184.3 |
| 6,148,935 | A | | 11/2000 | Wentworth et al. | ......... 175/398 |
| 6,568,488 | B2 | * | 5/2003 | Wentworth et al. | ...... 405/184.3 |
| 6,755,592 | B2 | * | 6/2004 | Janssen | ................... 405/184.3 |
| 7,086,808 | B2 | | 8/2006 | Wentworth et al. | ......... 405/184 |
| 7,353,889 | B1 | * | 4/2008 | Gunsaulis et al. | ........ 405/184.3 |
| 2005/0097689 | A1 | | 5/2005 | Harr | ........................ 15/104.16 |

* cited by examiner

*Primary Examiner*—Frederick L Lagman
(74) *Attorney, Agent, or Firm*—Philip G. Meyers

(57) ABSTRACT

A method for reforming or rerounding an underground pipe includes the initial steps of inserting a reforming tool into the underground pipe and locating the pipe reforming tool at a location to be reformed. At least two arms of the reforming tool are then extended into engagement with the inner periphery of the underground pipe, which arms push the underground pipe outwardly in a manner effective to change its cross-sectional shape. The arms may then be retracted and the tool withdrawn from the pipeline. Such "reforming" or "rerounding" tool is preferably mounted at the distal end of a rod string so that the tool can be pushed, pulled and/or spun by operation of the rod pulling and pushing machine powering the rod string.

16 Claims, 17 Drawing Sheets

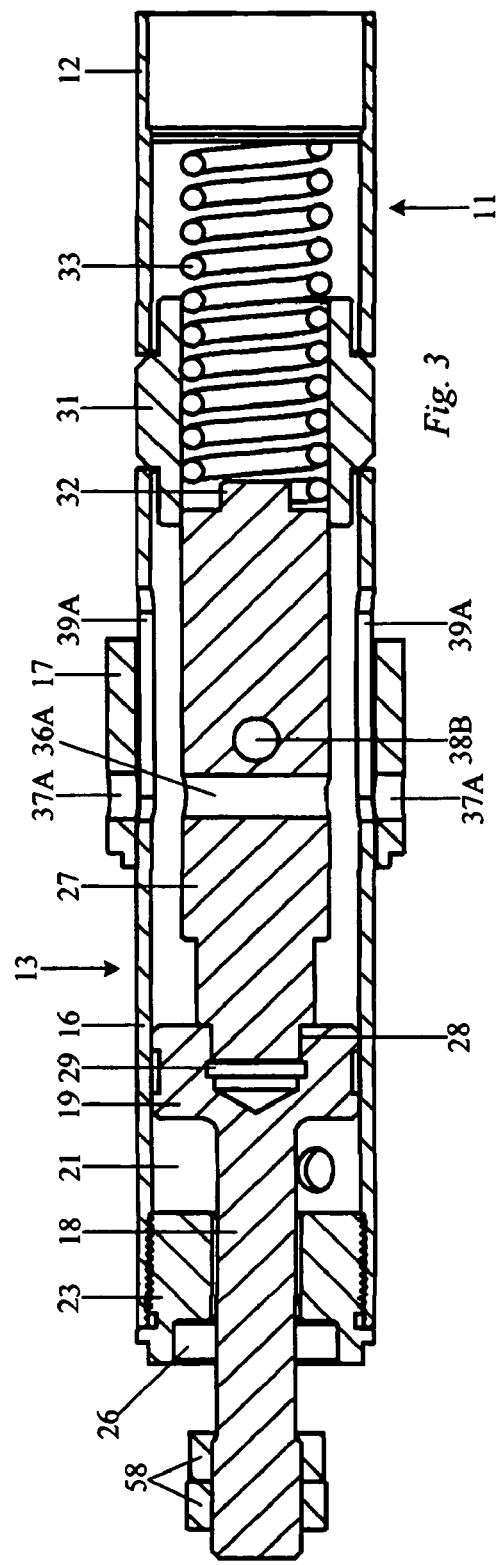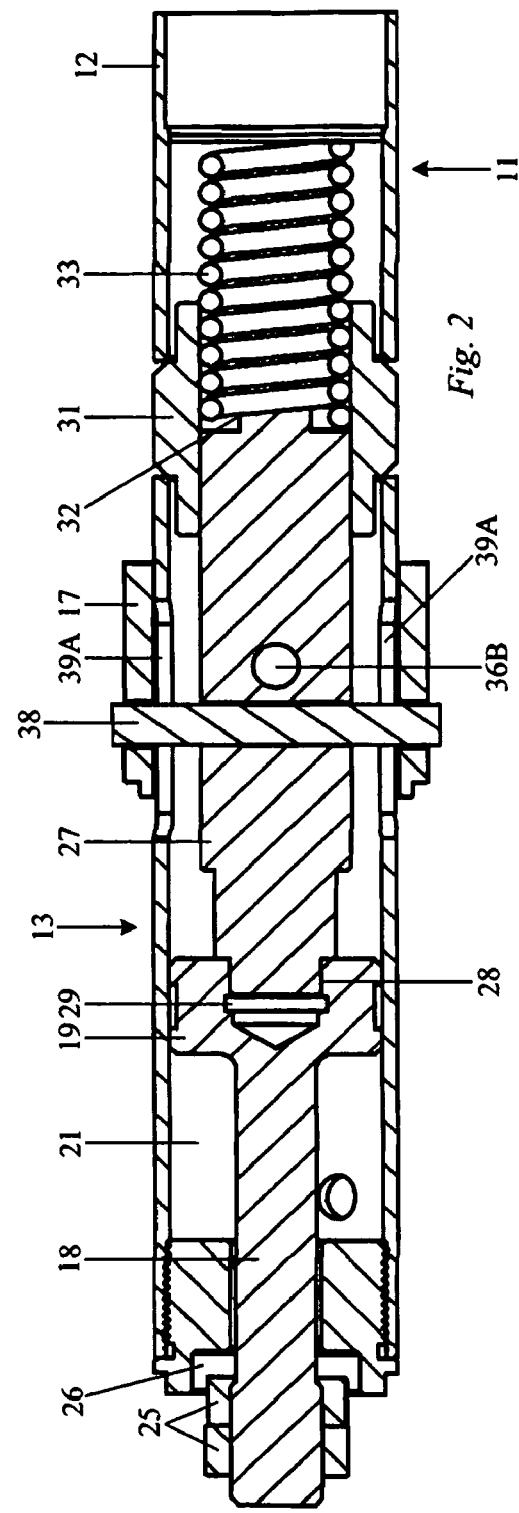

METHOD AND APPARATUS FOR PIPE REFORMING AND CLEARING

TECHNICAL FIELD

The invention related to an apparatus and method for removing obstructions from, stripping lining from and rerounding damaged or collapsed underground pipes.

BACKGROUND OF THE INVENTION

Underground pipelines used to convey water, gas, sewage and other fluids have, in the past been constructed of clay tile, concrete, cast iron, ductile iron, steel or even wood. These pipelines have limited useful service lives due to deterioration of mechanical properties leading to leakage, collapse, ingress of external matter (soil), or blockages due to, foreign matter buildup as a result of internal discontinuities. In some cases, deterioration of mechanical properties may be due to chemical attack. For example, concrete pipe and cast iron and/or ductile iron pipe is susceptible to interior degradation, particularly at the "crown" of the pipe, due to the effect of hydrogen sulfide gas. In other cases mechanical or environmental factors may cause the deterioration. For example, tree roots may accelerate or cause degradation or blockages of underground lines. Deterioration may occur throughout the body of the pipe or at the connections between pipe segments.

Pipe lining is a process that was developed to enhance or prolong the useful life of pipelines, in particular, underground lines. The lining is typically installed in-situ in cases wherein the mechanical and physical properties of the pipe have degraded, but before total collapse. In some cases, the lining is installed when the pipe is new during the manufacturing process with the intention of providing a barrier between the conveyed product and the host pipe material. These linings provided enhanced performance and service life. However, just as the host pipes had a limited life span, typically measured in decades, so did many of the early lining systems. Many linings that slowed or stopped deterioration of the host pipes are now suffering from the same ills that plagued the original host pipes. In some cases blockages due to lining collapse have resulted where the bond between the lining and host pipe has failed or where foreign material has entered between the lining and host pipe.

Failure of a pipe lining presents a dilemma to the owners of pipe systems that have previously been lined using early technology lining systems. In most instances, the failing lining prevents the use of new lining technologies to repair the existing host pipe, leaving the owners with two options. The lined pipe may be burst (see Streatfield et al., U.S. Pat. No. 4,738,565) and a new pipe pulled in, with some added difficulty due to the lining. Alternatively, the entire length of the pipe may be excavated to remove and replace the existing pipe. However, the host pipe holds value in that it could possibly be lined by utilizing one of the new and improved technologies.

The use of mechanical devices to clean and maintain pipes has been limited to the removal of relatively loose debris and damaged lining. For example, a mechanical rotary device for removing old pipe linings is disclosed in Wentworth et al. Ser. No. 11/324,018, filed Dec. 30, 2005. However, often a ductile pipe will partially collapse or become twisted, and needs to be restored to a round profile before lining can be attempted. See also Harr U.S. Patent Publication 20050097689, May 12, 2005, which describes a tool for cleaning a culvert including a bucket attachment to a rod string for pushing or pulling debris out of the culvert. A need remains for a process and apparatus suitable for clearing solid obstructions, removing linings or liners from and repairing damaged or twisted pipelines, and provide of restoring the shape of pipelines that have been distorted. This overall maintenance would prolong the life well being of such pipelines. The present invention addresses this need.

SUMMARY OF THE INVENTION

A method for reforming an underground pipe according to the invention includes the initial steps of inserting a reforming tool into the underground pipe and locating the pipe reforming tool at a location to be reformed. At least two arms of the reforming tool are then extended into engagement with the inner periphery of the underground pipe, which arms push the underground pipe outwardly in a manner effective to change its cross-sectional shape. The arms may then be retracted and the tool withdrawn from the pipeline. Such "reforming" or "rerounding" tool is preferably mounted at the distal end of a rod string so that the tool can be pushed, pulled and/or spun by operation of the rod pulling and pushing machine powering the rod string. "Rerounding" for purposes of the invention means restoring the interior of the pipeline at the target location to a more cylindrical profile. Following rerounding or reforming, the pipeline will most likely be relined as discussed further below.

In a preferred form of the invention, the arms of the reforming tool are collapsible and connected to a hydraulic cylinder, such that the extending and retracting steps are carried out by activating or actuating the hydraulic cylinder. The hydraulic cylinder can operate using hydraulic fluid such as water supplied through the rod string. A double-acting cylinder may be used, but preferably a spring biases the hydraulic cylinder to a collapsed position in which the arms are retracted, and pressure from the hydraulic fluid supplied through the rod string overcomes the force of the spring when the arms are extended. Fluid in the hydraulic cylinder flows through an exhaust port into the pipeline when the spring biases the hydraulic cylinder to a collapsed position.

A collapsible rotary apparatus for reforming an underground pipeline according to the invention includes a tubular housing including a rear connector configured for connection to a drill string, and a hydraulic cylinder including a cylinder body and an extendable piston. At least two collapsible arms are mounted on the tubular housing in positions to exert forces in opposing directions on a pipeline interior when the arms are extended. Linkages connect each of the arms to the hydraulic cylinder so that the arms are extended in response to activation of the hydraulic cylinder. Suitable means for returning the arms to a collapsed position following activation of the hydraulic cylinder is provided, as by using a spring or double acting cylinder as mentioned above. These and other aspects of the invention are discussed in the detailed description that follows.

BRIEF DESCRIPTION OF THE DRAWINGS

The invention will hereafter be described with reference to the accompanying drawings, wherein like numerals denote like elements, and wherein:

FIG. 2 is a lengthwise section of the cylindrical housing of the apparatus shown in FIG. 1;

FIG. 3 is a lengthwise section of the cylindrical housing of the apparatus shown in FIG. 2, in a collapsed or at rest position;

DETAILED DESCRIPTION

Figure 1:
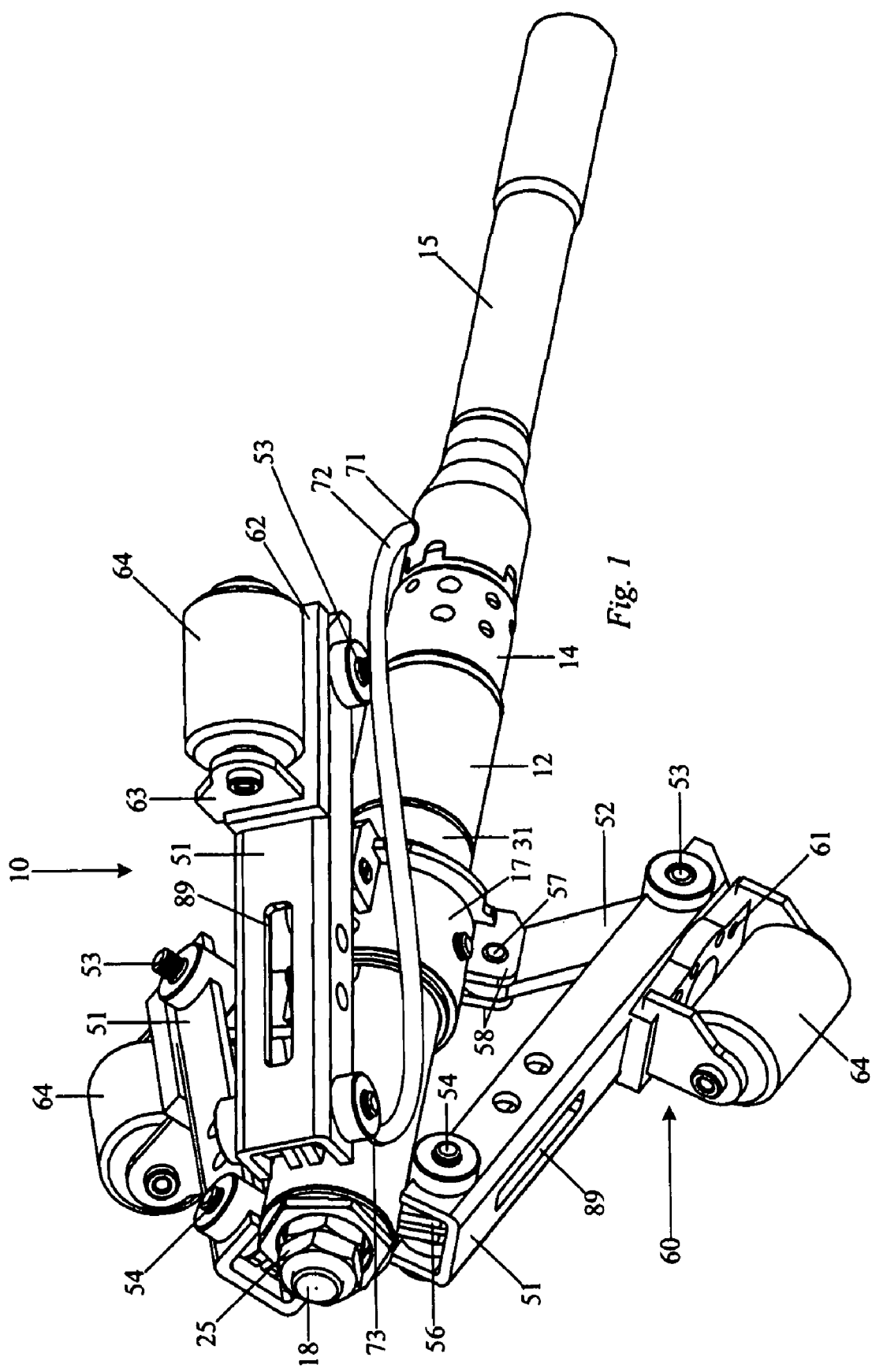
FIG. 1 a perspective side view of an apparatus according to the invention including a pipe rerounding tools attached to the collapsible arms, wherein the arms of the device are illustrated in an extended or deployed position.

Referring to FIGS. 1 and 2, a reforming apparatus 10 according to the invention is designed for use with a horizontal directional drilling (HDD) machine such as the Vermeer Navigator or a rod pushing machine that is incapable of spinning the rod string. Apparatus 10 includes a tubular housing 11 having a threaded recess-type connector 12 at its rear end suitable for connection to the distal end of a drill string which may include an adapter 14 and starter rod 15 mounted on the distal end of a string of hollow rods. Connector 12 shown is a Splinelok® connection of the type described in Wentworth et. al. U.S. Pat. No. 6,148,935, Nov. 21, 2000, the contents of which are incorporated by reference herein. However, an API threaded socket can be used for direction connection to the threaded leading end of the drill string.

Housing 11 at its leading end includes the body portion of a hydraulic cylinder 13. As shown in FIGS. 3 to 9, cylinder 13 includes a tubular cylinder body 16 slidably disposed inside of an outer sleeve (runner) 17, and a piston 18 disposed for reciprocation inside of cylinder body 16. Piston 18 has a rear head 19 that is in sliding contact with the inner surface of body 16. Contact between head 19 and cylinder body 16 is close but not sealed, so that fluid inside of the pressure chamber 21 can leak out at a controlled rate. For this purpose, a lengthwise relief groove 22 can be provided along the outside of head 19 (see FIG. 8).

The front end of piston 18 extends through a central hole in a head nut 23 threadedly secured in the front end of open end of cylinder body 16. Engagement between piston 18 and nut 23 may be sealed, or permit a small amount of pressure fluid leakage out of the front of the unit. One or more spacer nuts 25 are threaded onto the exposed front end of piston 18 and can be adjusted to stop the piston from moving further back than the position at which rearwardmost nut 25 engages the bottom of a front recess 26 in head nut 23.

The front end of a plunger 27 is engaged in a rearwardly opening recess 28 in piston 18 by means of a split ring 29 that fits in an annular groove 30 in the wall of recess 28. A rear end portion of plunger 27 is slidably mounted in a guide sleeve 31 that forms part of housing 11 and may be welded or otherwise secured to the back of cylinder body 16. Plunger 27 has a rearwardly extending central boss 32 at its rear end. A compression spring 33 is inserted into guide sleeve 31 with its front end wound over boss 32. The rear end of spring 33 is disposed inside connector 12 and held by any suitable means, such as a front end face of adapter 14. To complete housing 11, connector 12 is welded or otherwise secured to the back of guide sleeve 31.

Piston 18 and its extension (plunger 27) are mechanically engaged with outer sleeve 17 by means of a first transverse through hole 36A in plunger 27 which is in alignment with a pair of threaded holes 37A in sleeve 31, and a pin 38 removably mounted in holes 36A, 37A. Pin 38 passes through a pair of grooves 39A on opposite sides of cylinder body 16. Grooves 39A are elongated in the lengthwise direction of apparatus 10 so that cylinder body 16 can slide relative to piston 18, plunger 27 and sleeve 17 over a range equal to the length of grooves 39A. A second pair of holes 36B, 37B and second pair of grooves 39B are provided at positions rearwardly offset from 36A, 37A, 39B and offset by 90° radially. In this manner, pin 38 can be moved from holes 36A, 37A to 36B, 37B in order to change the stroke of the unit as explained hereafter.

At least two (in this example, three) arm assemblies 50 extend and retract in response to movement of piston 18. Each arm assembly includes a pair of front and rear beams 51, 52 connected by a middle pivot 53. Front beams 51 are connected to a front end portion of cylinder body 16 by a linkage including pivots 54 mounted in sets of brackets 56 on the outside of cylinder body 16. In a similar fashion, the rear ends of rear beams 52 are connected to outer sleeve 17 by linkages comprising pivots 57 mounted in sets of brackets 58 on the outside of sleeve 17. Brackets 56, 58 are aligned with each other in each arm assembly 50 and are positioned so that arm assemblies 50 will be spaced equiangularly, 120° apart in this example, which is sufficient to exert forces in opposing directions on the pipeline interior. Front and rear, beams 51, 52 are U-shaped in cross section with rear beams of slightly less width such that the front end of each beam 52 fits inside the rear end of a beam 51 as shown. Each pivot 53 passes through a pair of holes in each side of beams 51, 52. Front beams 51 are longer than rear beams 52, and with the arm assembly in a collapsed position as shown in FIG. 5, pivots 53 are positioned outwardly and far to the rear of rear pivots 57.

Holes provided in the outside of the rear end of each front beam 51 permit a variety of removable attachments to be mounted in a position to engage the inside of a pipeline. In FIGS. 1-9, a roller assembly 60 is mounted to each front beam 51 by any suitable means, such as welding or bolts set in holes in a base plate 62 of the assembly 60 and corresponding holes in front arm beam 51. A pair of end brackets 63 rotatably support a cylindrical roller 64. Rollers 64 are positioned for tangential rolling contact with the inside of a pipeline in a manner suitable for a rerounding operation.

Figure 4:
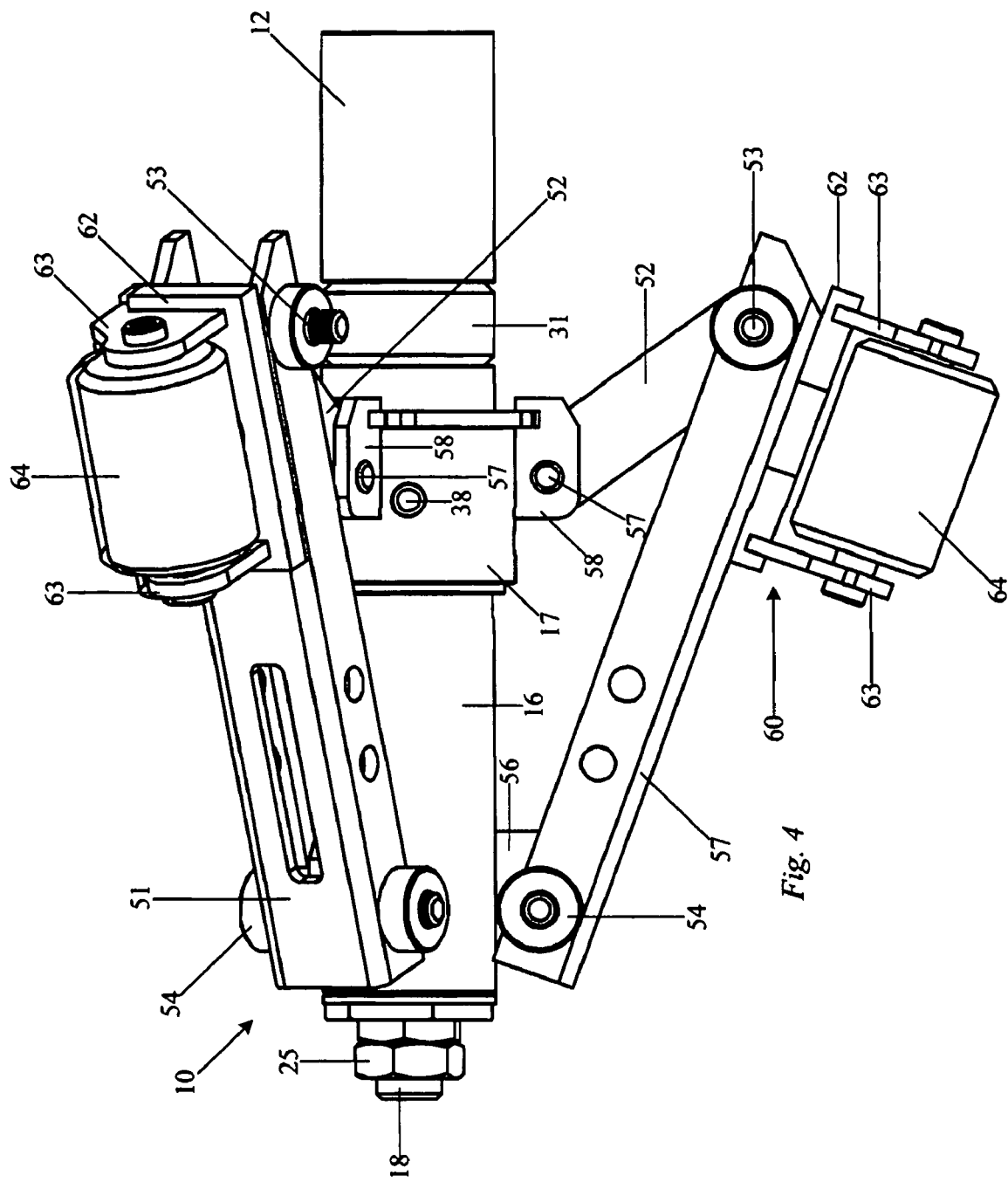
FIG. 4 is a side view of the apparatus shown in FIG. 1.

Such an operation may be carried out as follows. Apparatus 10 is mounted at the distal end of a string of drill rods powered by an HDD machine using adapter 14 and starter rod 15. Additional rods are added as apparatus 10 in a collapsed state is advanced to a location in the pipeline in need of reforming or re-rounding. Once at the desired location, pressure fluid such as water is fed through the center of the rod string and enters a central channel in starter rod 15. Further flow of water through adapter 14 is blocked such as by plugging one end of the central bore normally provided. Instead water flows through a radial hole 71 in the wall of starter rod 15. A hose 72 provided with end fittings feeds water through a port 73 through the wall of cylinder body 16. The pressure, taking into account leakage, is great enough to compress spring 33 and cause piston 18 and plunger 27 to move rearwardly relative to housing 11. The front end of piston 18 pulls part way inside of cylinder body 16 as shown in FIGS. 2 and 4. Sleeve 17 moves with piston 18 and plunger 27 since it is connected to plunger 27 by pin 38, but travel is limited by the rear ends of the associated grooves 39A or 39B. The stroke of the cylinder thus cannot exceed the length of grooves 39A, 39B.

Figure 5:
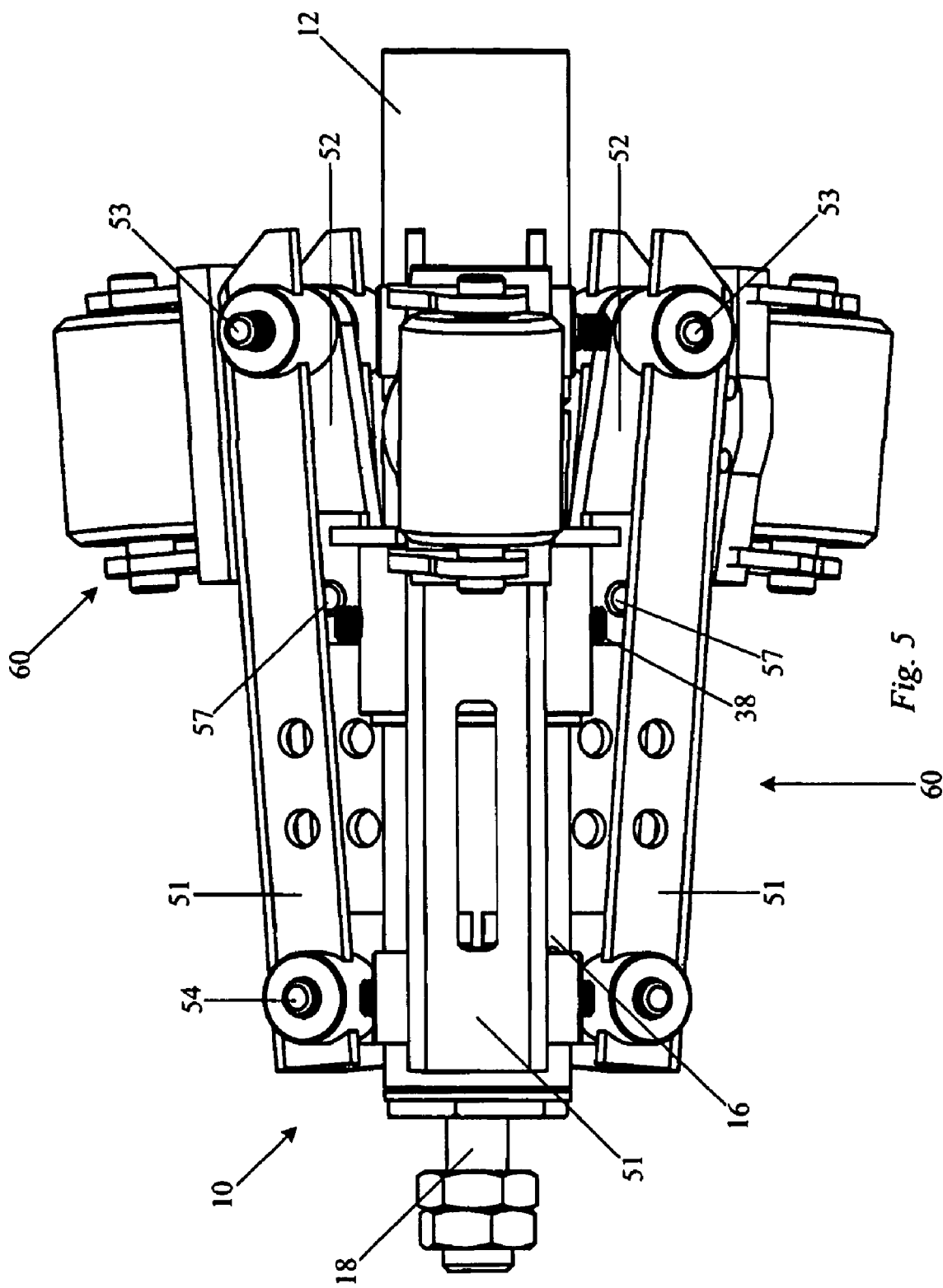
FIG. 5 is a side view of the apparatus shown in FIG. 1 in a collapsed position.
Figure 6:
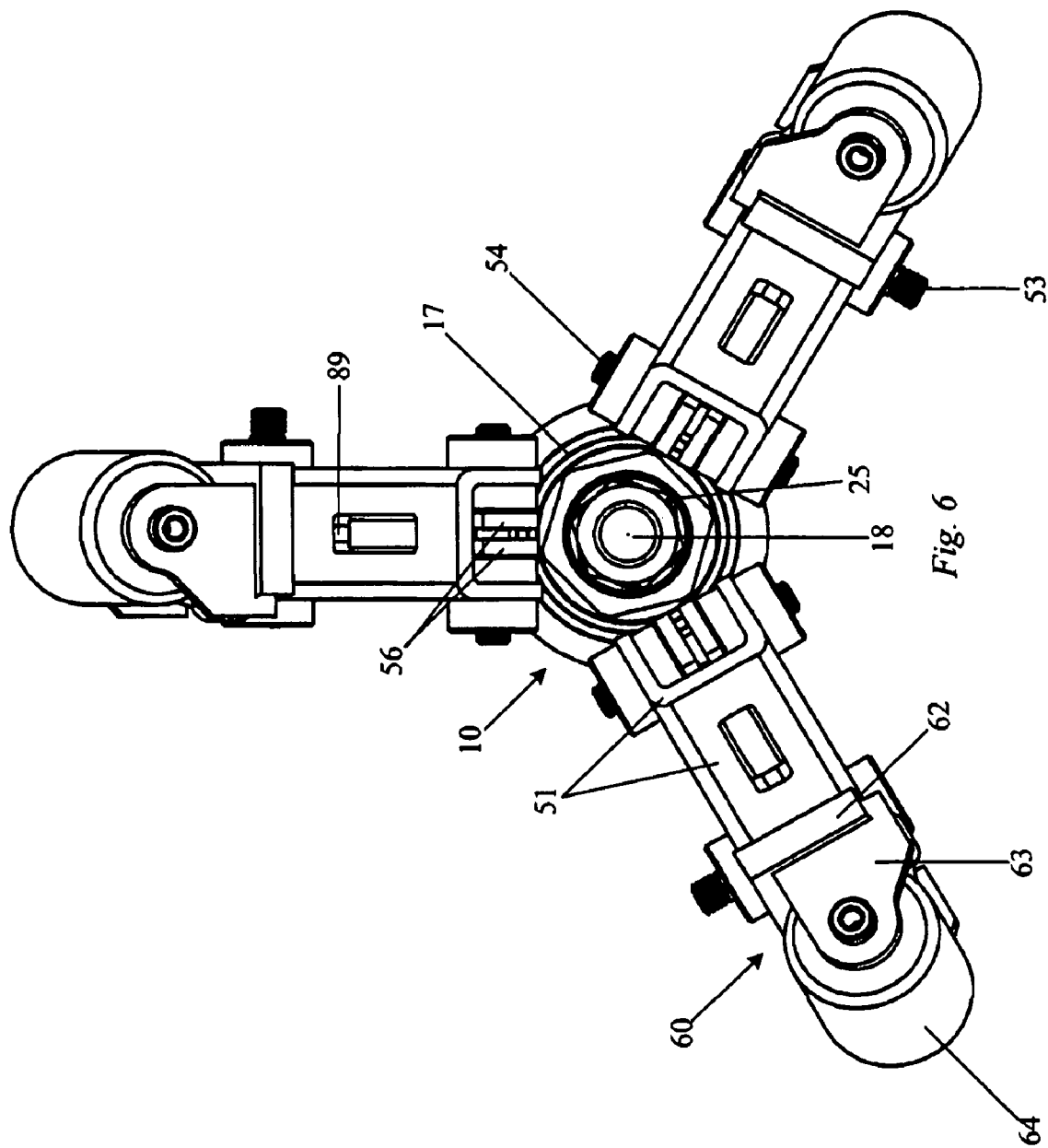
FIG. 6 is a front view of the apparatus of FIG. 1.
Figure 7:
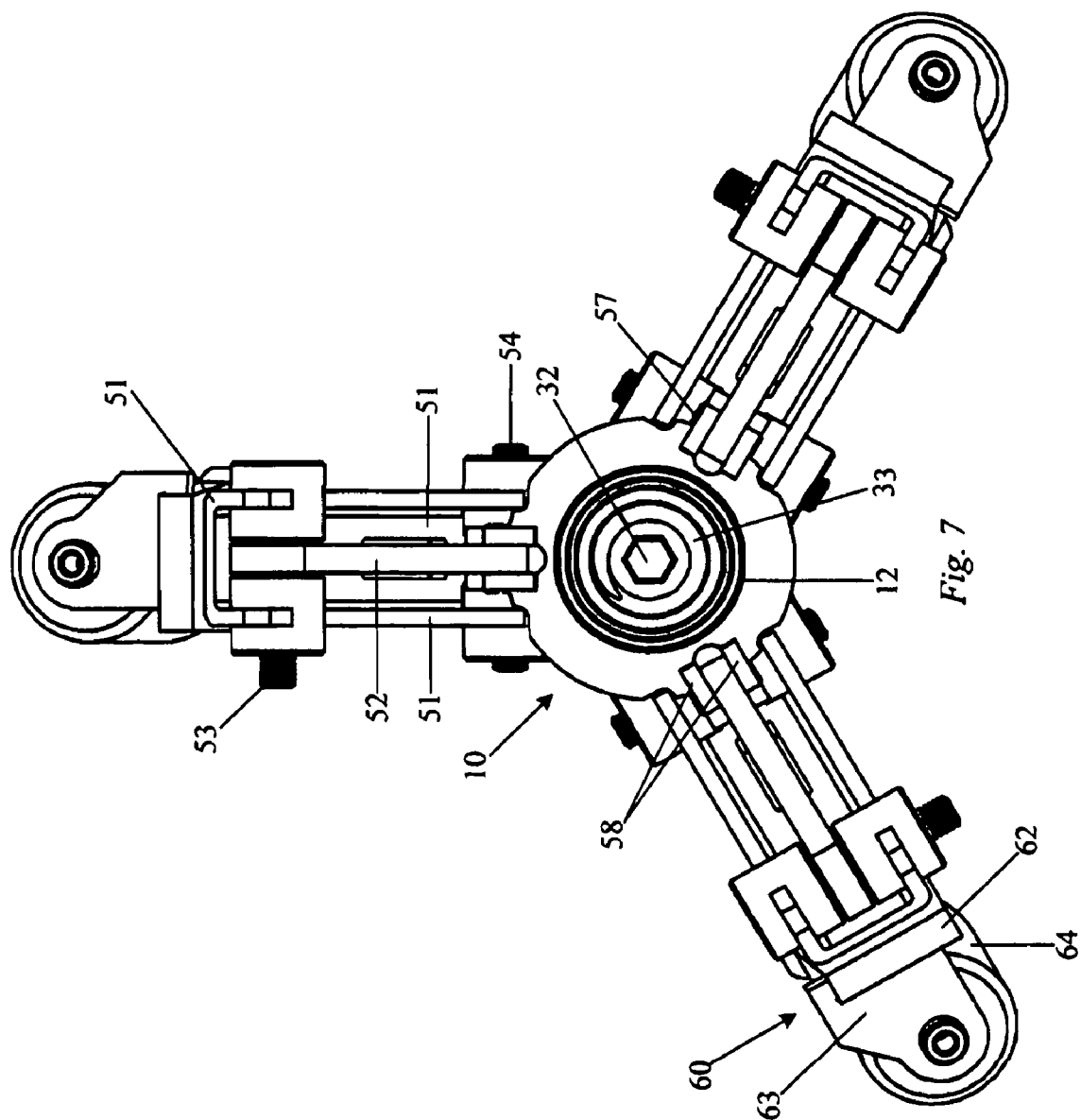
FIG. 7 is a rear view of the apparatus of FIG. 1.
Figure 8:
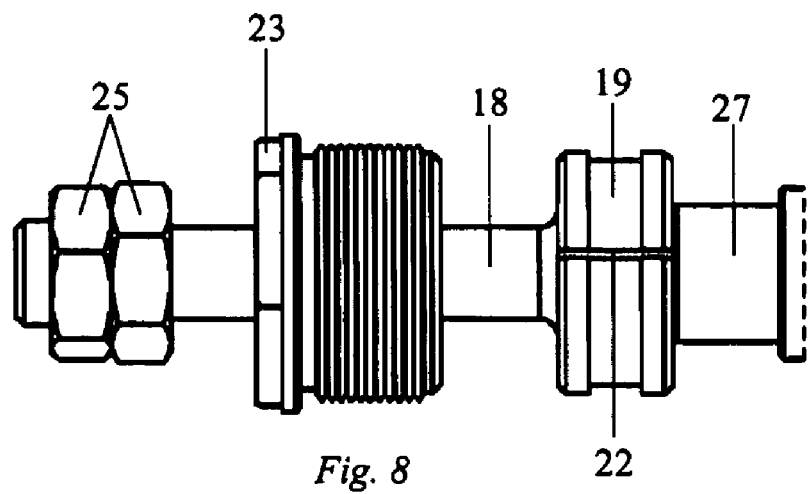
FIG. 8 is a partial side view of a piston and head nut assembly of the apparatus of FIG. 1.
Figure 9:
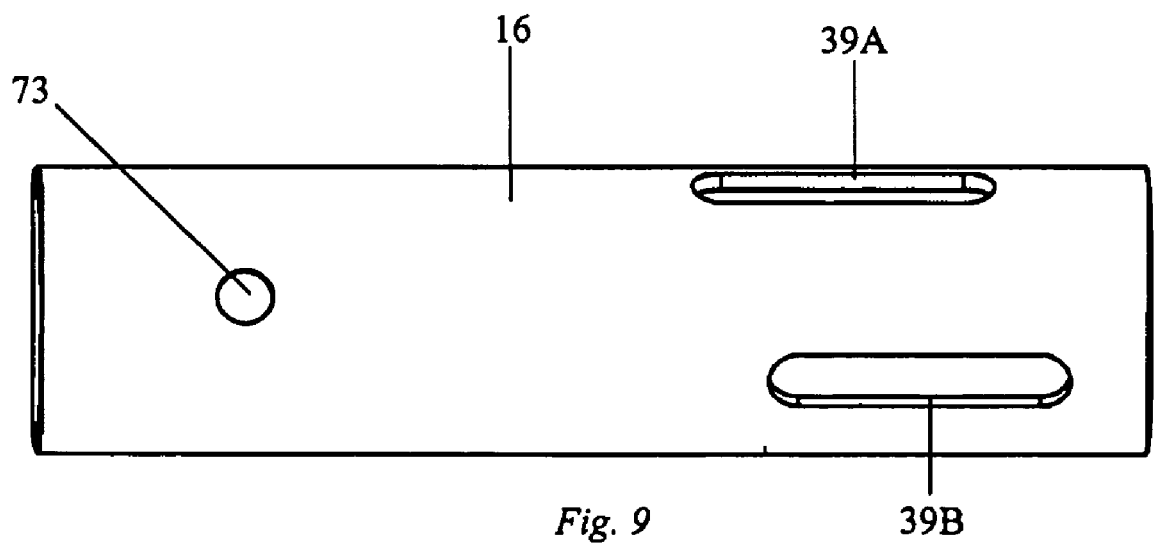
FIG. 9 is a side view of the cylinder body of the apparatus of FIG. 1.
Figure 18:
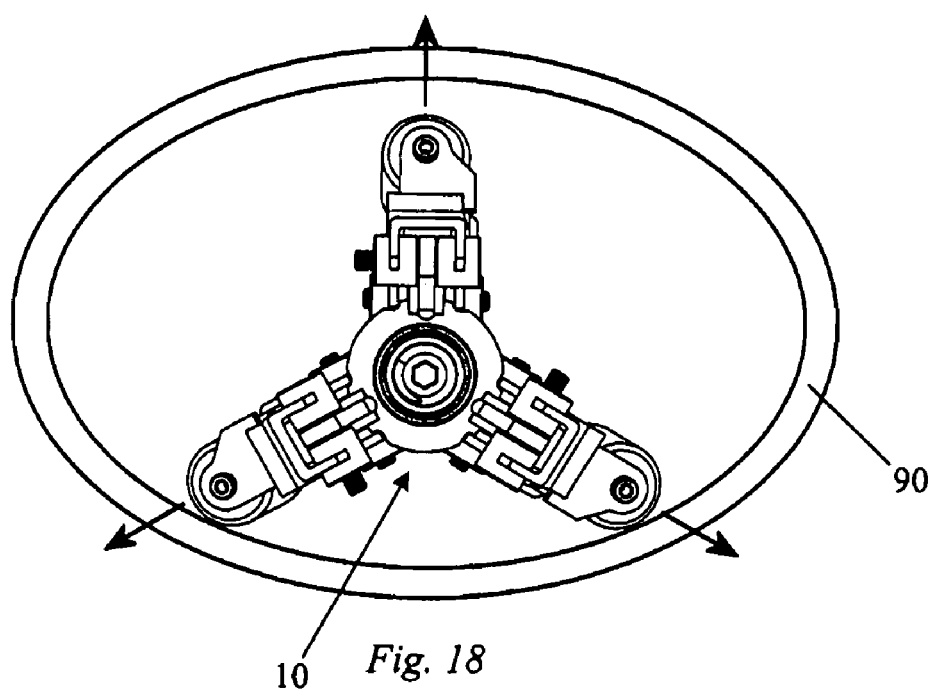
FIG. 18 is a rear view of an apparatus according to the invention disposed in a deformed ductile pipeline.
Figure 19:
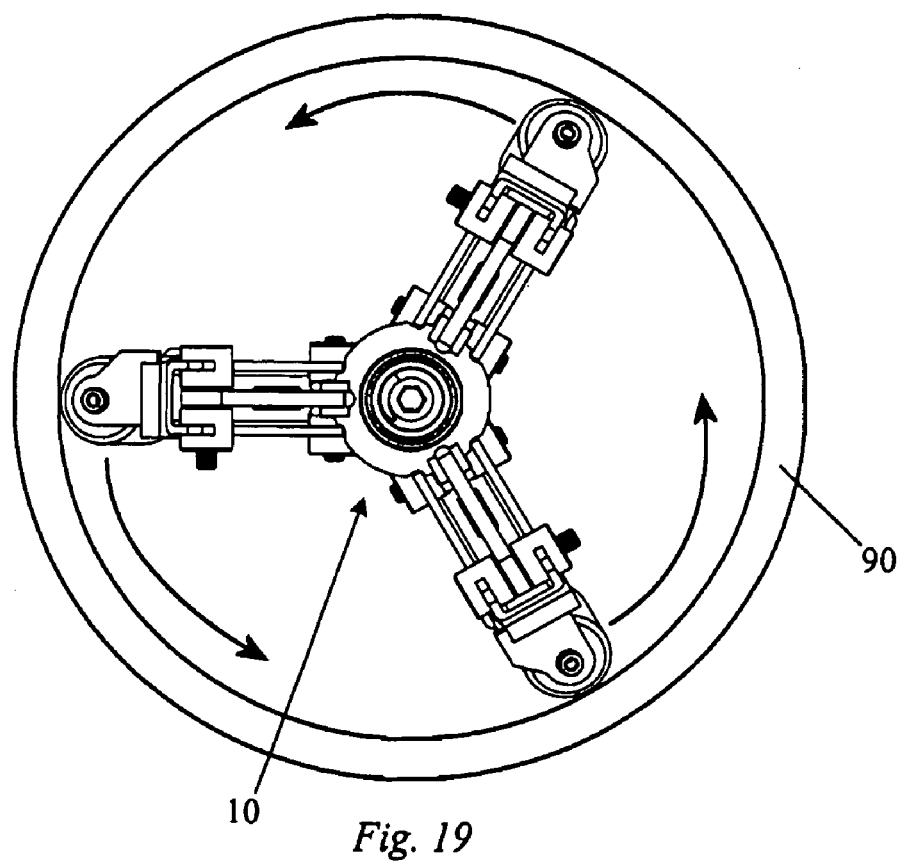
FIG. 19 is a rear view of an apparatus according to the invention disposed in a ductile pipeline following a rerounding operation according to the invention.

As piston 18 moves rearwardly and the distance between front and rear pivots 54 and 57 increases, the arm assemblies 50 unfold outwardly by pivoting about middle pivots 53, moving from the position shown in FIG. 5 to the position shown in FIG. 4. Rollers 64 move to engage the inner periphery of the pipeline, and the force applied by means of arm assemblies 50 or the outside of the rear end of each front beam 51 (if no rollers are provided) is great enough to force a ductile pipe wall outwardly. As illustrated in FIGS. 18 and 19, during or after such a pushing operation, the operator may rotate the drill string so that apparatus 10 both spins and pushes outwardly at the same time in a manner to restore the interior of the pipeline at the target location to a round profile.

Once the rerounding operation is done, the supply of pressurized water to chamber 21 is cut off. Water continues to leak out the front and/or rear ends of chamber 21. Water escaping through the rear end of piston 18 can exit housing 11 through grooves 39A, 39B. Spring 33 expands to push the water out of chamber 21 and move piston 18 back to its extended position. This in turn reverses the previous movement of arm assemblies 50, causing them to return to the collapsed position. At this stage, the apparatus 10 can then be withdrawn from the pipeline or else moves to another location in need of reforming at which the foregoing steps are repeated.

Figure 10:
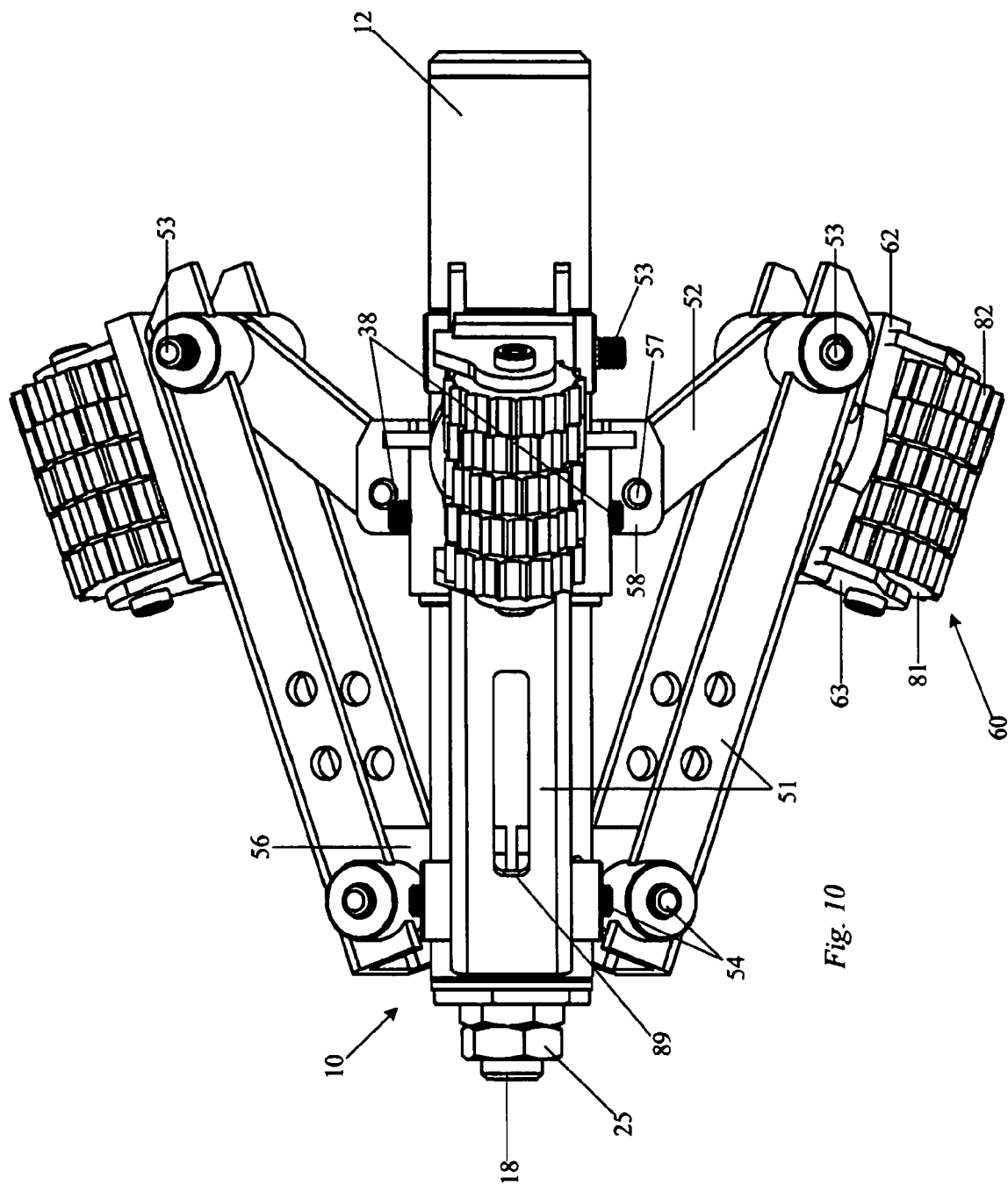
FIG. 10 is a side view of the apparatus of FIG. 1, wherein the pipe rerounding tool has been replaced with a lining stripping tool.
Figure 11:
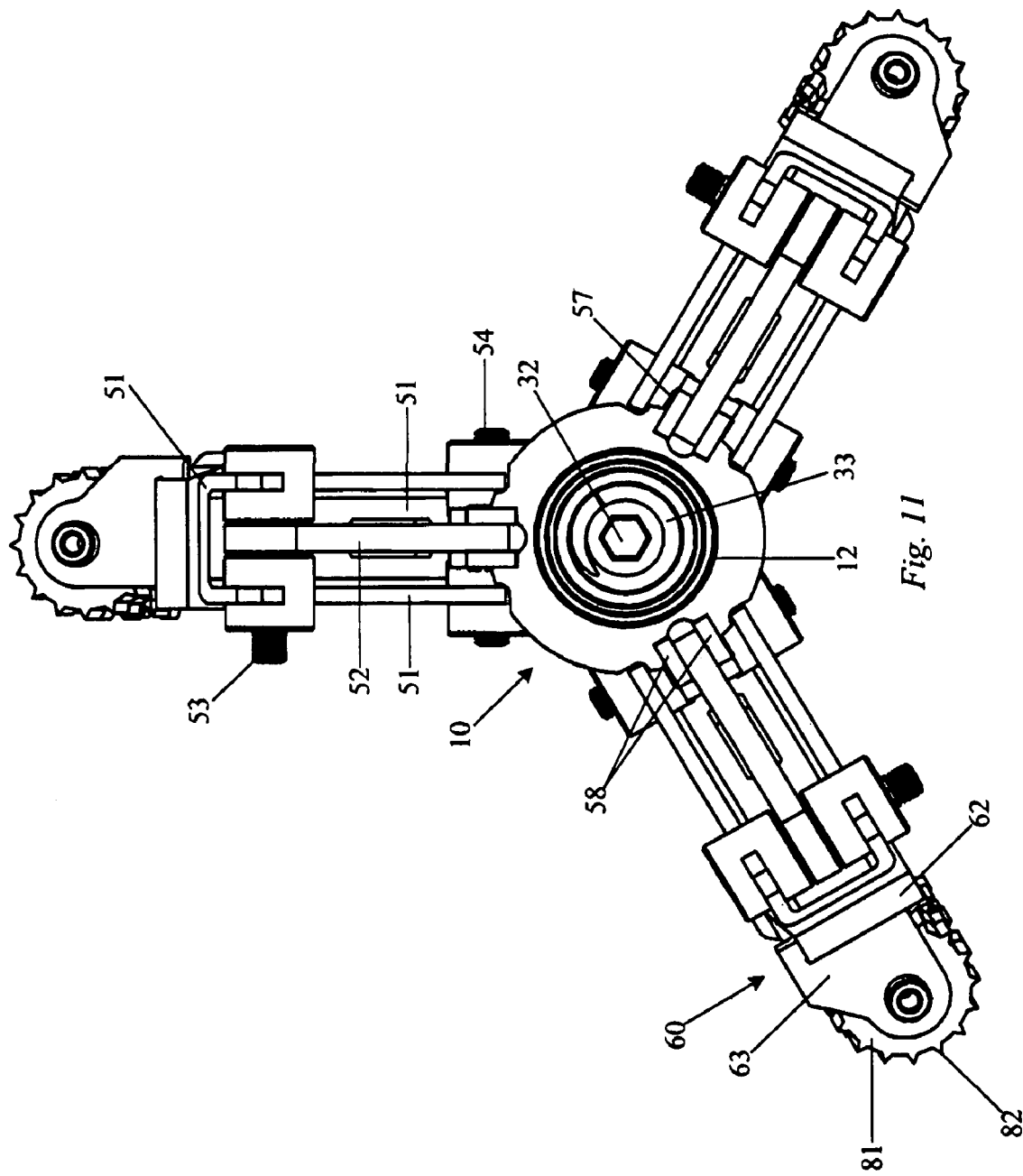
FIG. 11 a rear view of the apparatus of FIG. 10.

As shown in FIGS. 10-11, rollers 64 can be replaced with stacked cutter wheels 81 provided with teeth or serrations 82 for stripping a liner from the inside of the pipeline at the same time as, or instead of, reforming it. Apparatus 10 can thereby be used for multiple purposes depending on the situation.

Figure 12A:
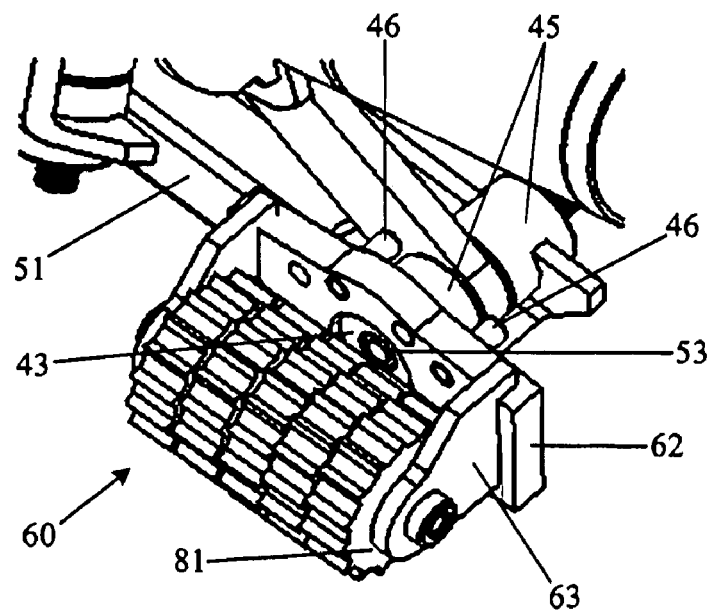
FIG. 12A is a partial perspective view of a roller assembly attachment system according to the invention.
Figure 12B:
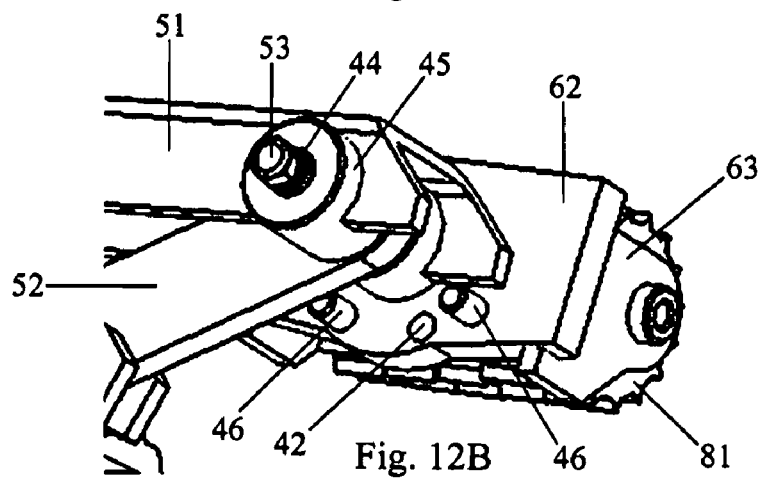
FIG. 12B is a partial perspective view of a roller assembly attachment system of FIG. 12A, showing the opposite side.

According to a further aspect of the invention, roller assemblies 60 using either roller 64 or stripper wheels 81 can be mounted in different positions, and can be installed and removed interchangeably. FIGS. 12A and 12B illustrate an arrangement for mounting of wheels 81 on the sides of front beams 51. A large central hole 41 is provided through base plate 62 together with a series of spaced smaller holes 42 positioned to one side of it. A hat bushing 43 is set in hole 41 so that its flange engages the outer surface of base plate 62 just below wheels 81. A bolt acting as pivot 53 is countersunk into bushing 43 and secured at its other end by a nut 44, thereby rotatably mounting roller assembly 60 to arm beam 51. Pivot 53 passes through a pair of bearing sleeves 45 welded into aligned, nearly circular openings in the sides of arm beam 51. Arm 52 is mounted on pivot 53 between bearing sleeves 45.

So secured, the roller assembly can pivot to conform to the inside profile of the pipeline 90. To limit pivoting of roller assembly 60 so that it does not spin about pivot 53, two or more roll pins 46 are set into smaller holes 42 and extend from the underside of plate 62. Roll pins 46 engage the side of arm beam 51 to prevent roller assembly 60 from pivoting too far in either direction. To remove the roller assembly 60, roller 64 or wheels 81 are first removed from brackets 63, and then pivot 53 is removed so that hat bushing 43 and roller assembly 60 can be pulled off of arm beam 51. The bolt used as pivot 53 can then be replaced or substituted with a shorter bolt set in its place. Roller assembly 60 can then be refitted and replaced.

Figure 13A:
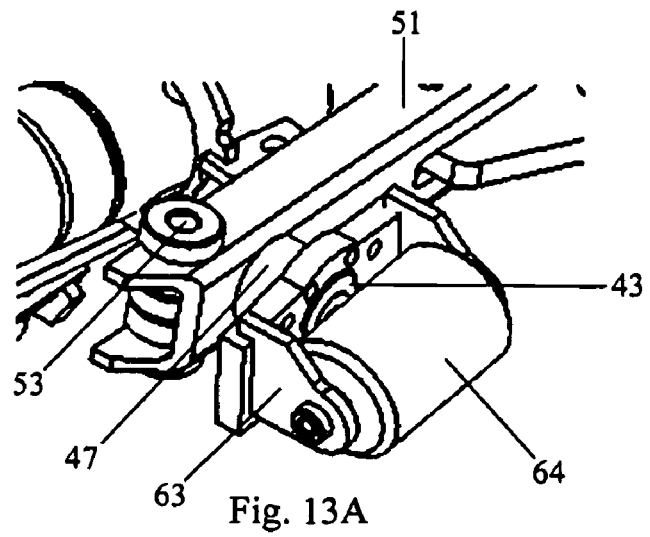
FIG. 13A is a partial perspective view of a further roller assembly attachment system according to the invention.
Figure 13B:
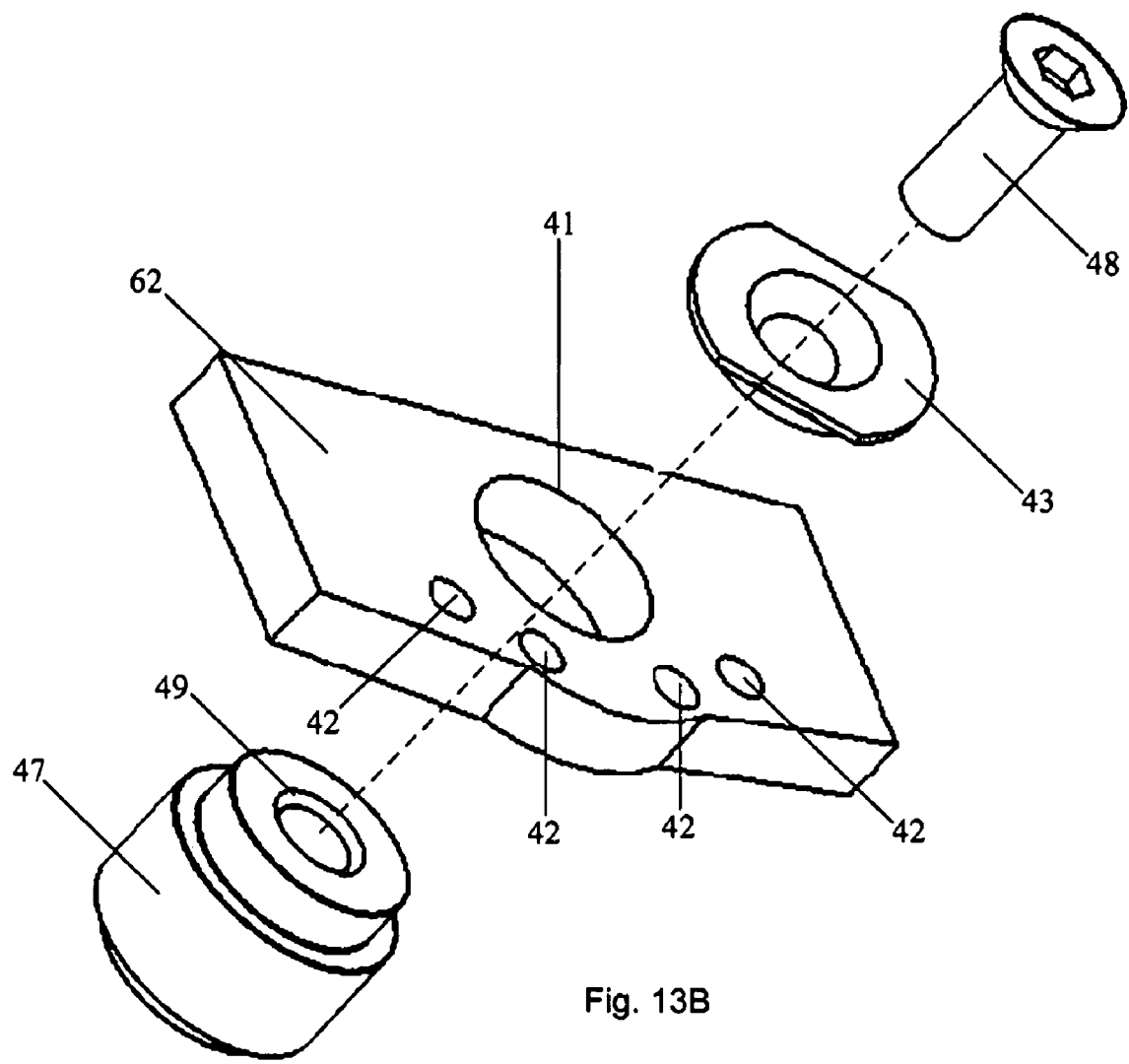
FIG. 13B is an exploded view of portions of the attachment system shown in FIG. 13A.
Figure 14:
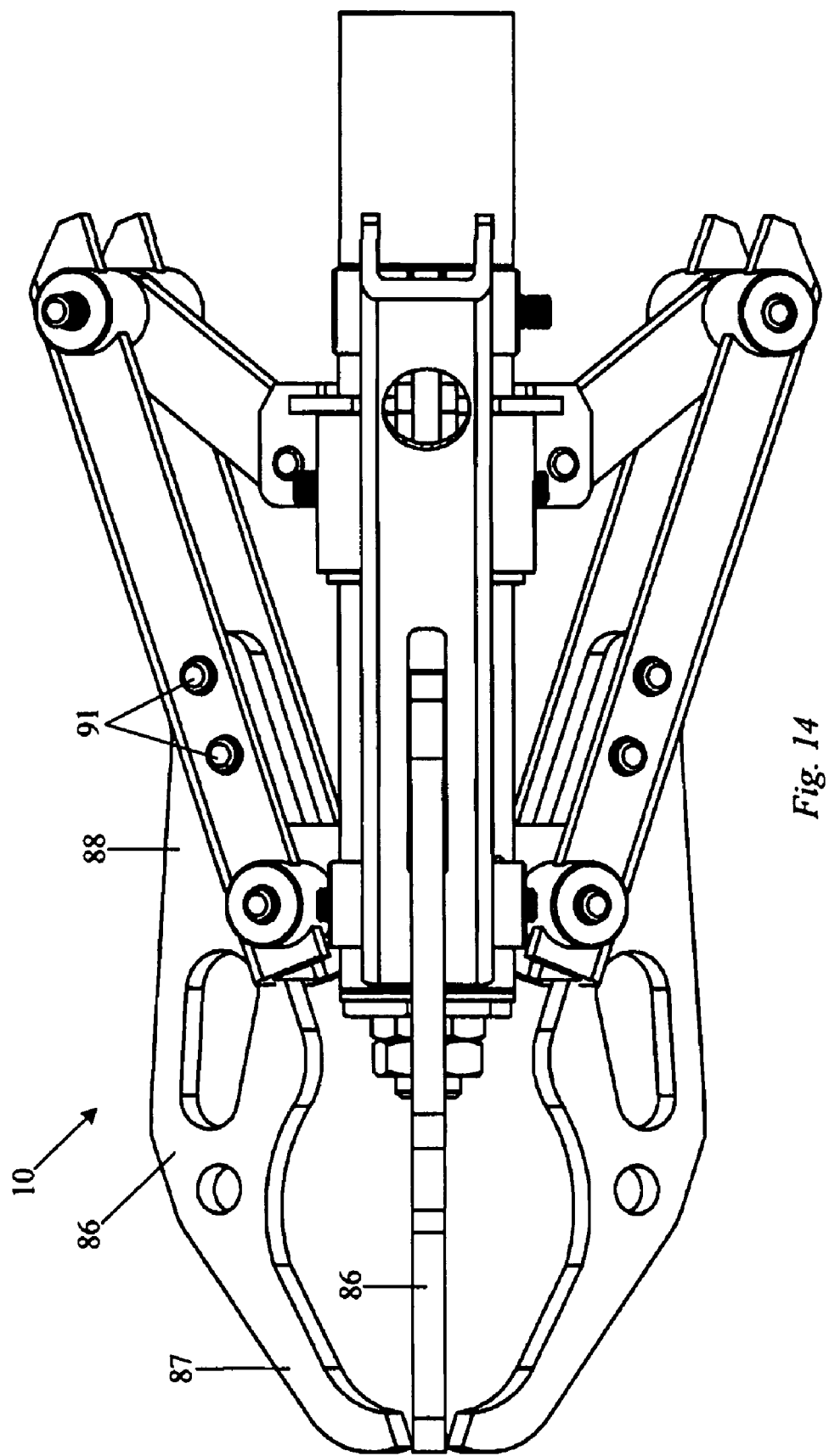
FIG. 14 is a side view of the apparatus of FIG. 1, wherein the pipe rerounding tool has been removed and a set of grappling claws which are in a closed position have been installed.
Figure 15:
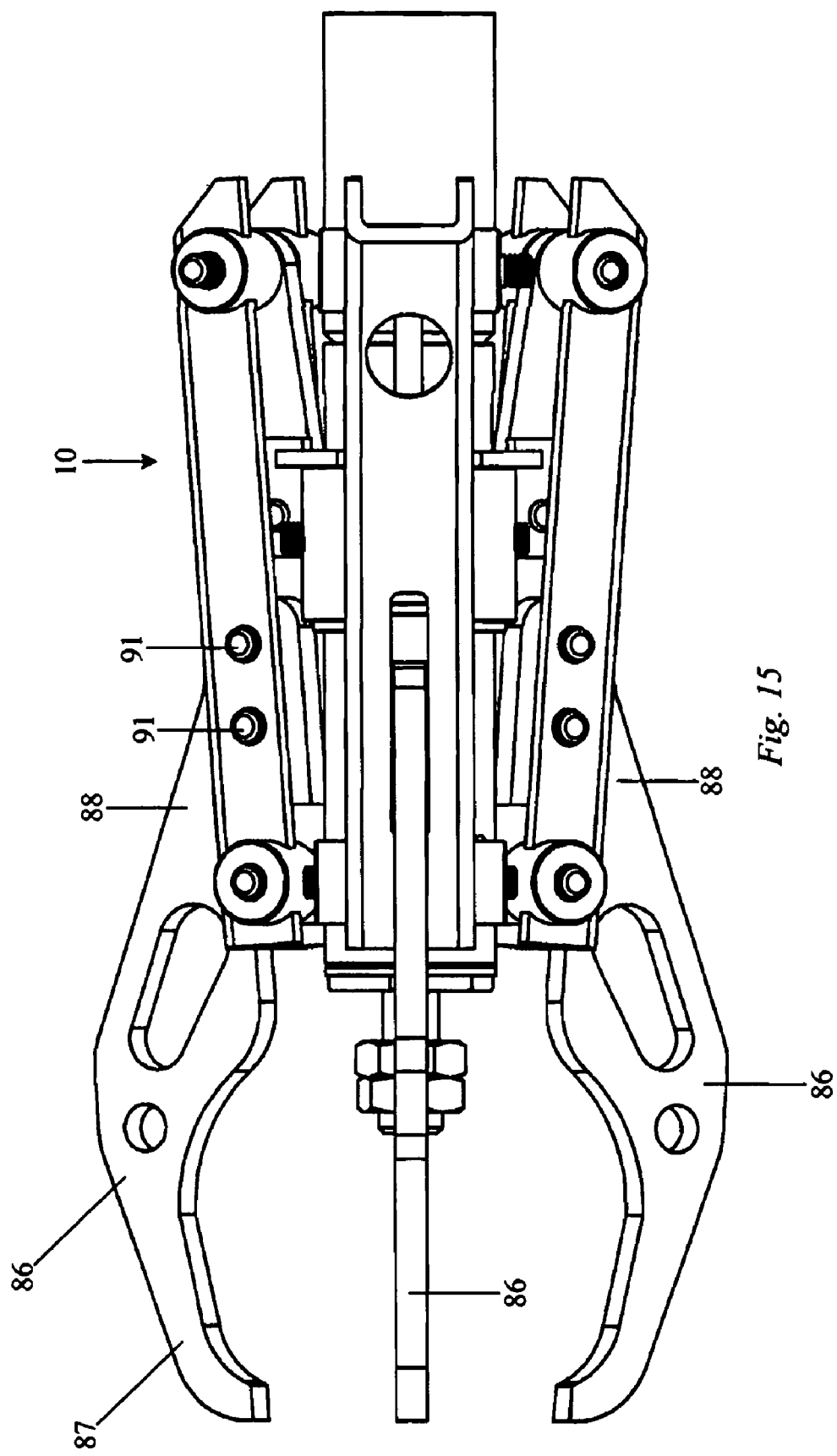
FIG. 15 is a side view of the apparatus of FIG. 14, with the grappling claws in an open position.
Figure 16:
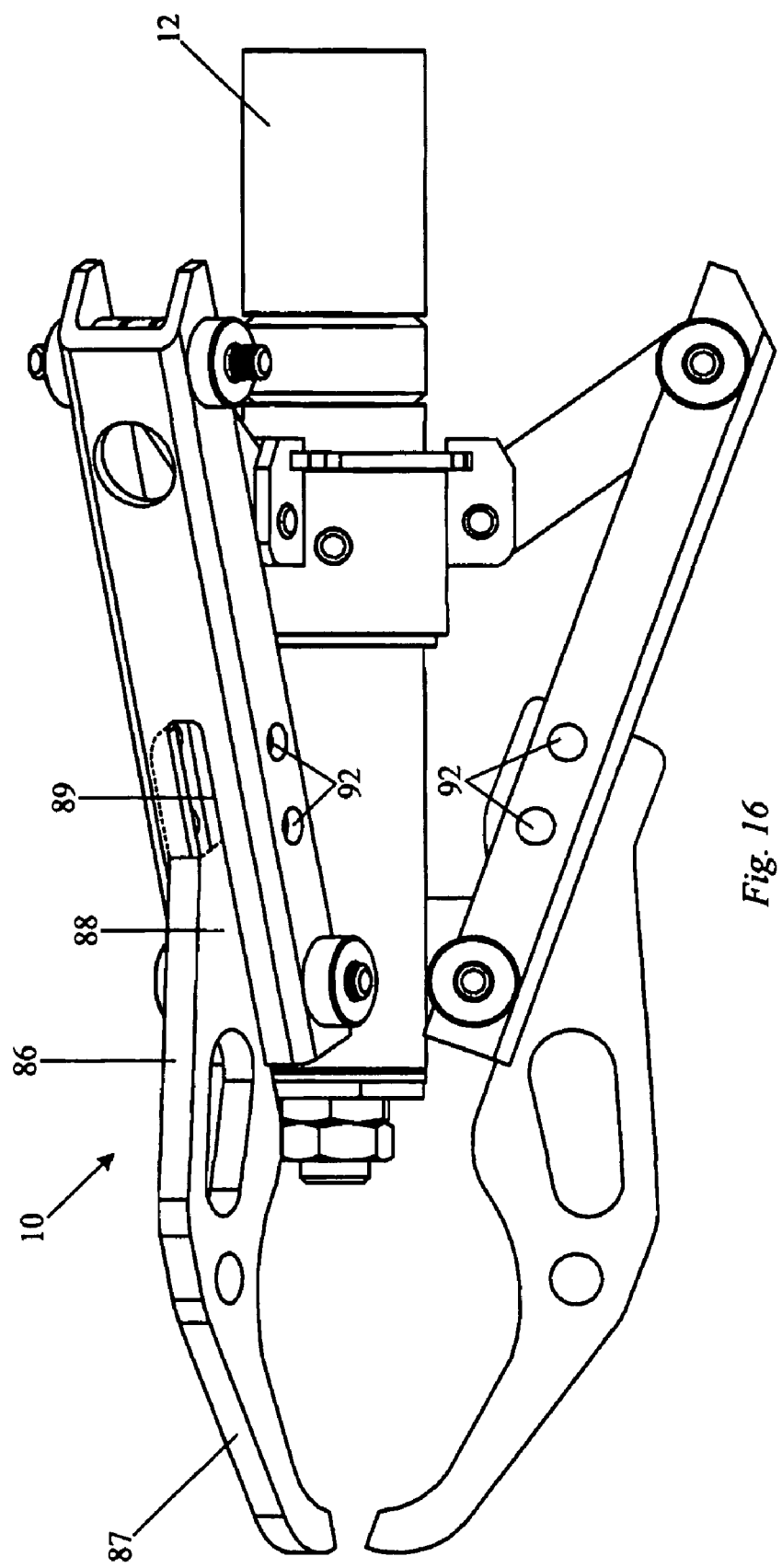
FIG. 16 is a side perspective view of the apparatus of FIG. 14.
Figure 17:
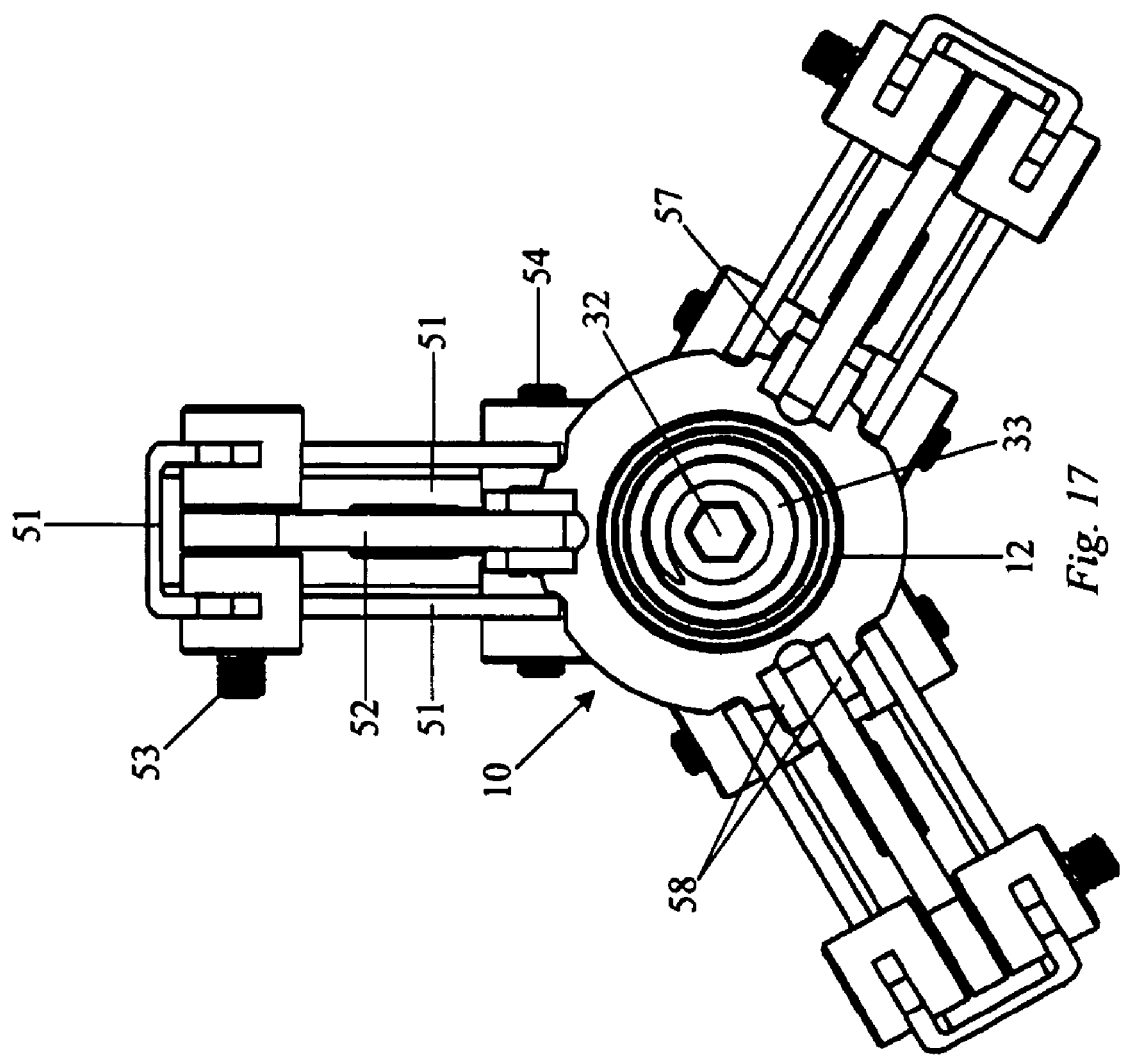
FIG. 17 is a rear view of the apparatus of FIG. 12.

FIGS. 13A and 13B shows a roller assembly 60 moved to a position on the top or outside of beam 51, rather than on its side. In this embodiment, a boss 47 is welded to the outside of each arm 51 near pivot 53. Plate 62 is positioned over boss 47 so that hole 41 is in alignment with it. Hat bushing 43 is inserted through hole 41 and is secured to boss 47 with a tap screw 48. Screw 48 engages a threaded central hole 49 in boss 47. Base plate 62 and hat bushing 43 are interchangeable for use in either of the side mount and top mount embodiments. Additional spacers similar to bushing 43 in shape can be stacked on bushing 43, and a longer screw 48 can be used to vary the distance that roller assembly 60 is spaced from arm beam 51. This may vary depending on the size of the pipeline 90 and the maximum size the device is capable of opening to when the arms are fully extended.

Occasionally a pipe cleaning and reforming operation is halted by a large obstruction such as a stone or piece of wood or concrete that is blocking the collapsed pipeline. In a further adaptation of the apparatus 10 according to the invention shown in FIGS. 12-15, roller assemblies 60 are removed to reduce the external diameter of the device when the arms are unfolded, and a set of three gripping jaws 86 are mounted on front beams 51. Each jaw 86 has a front, inwardly curving or hook-shaped tip portion 87 and a rear shank 88. Shank 88 of each jaw 86 extends through lengthwise openings 89 in the outer wall of beam 51. Shank 88 has a pair of holes therein by which it can be mounted on two pins 91 each set through a pair of holes 92 in the sides of front beam 51 at spaced positions as shown. By this means jaws 86 move in tandem with arm beams 51 and can be opened and closed, or moved to a partially closed position, as needed to grasp an object in the pipeline. Once the object us held by jaws 86, the drill string is withdrawn so that the object is brought out of the pipeline. This provides an alternative to attempting to push/or pull the object as described in the Harr patent publication cited above.

Figure 20:
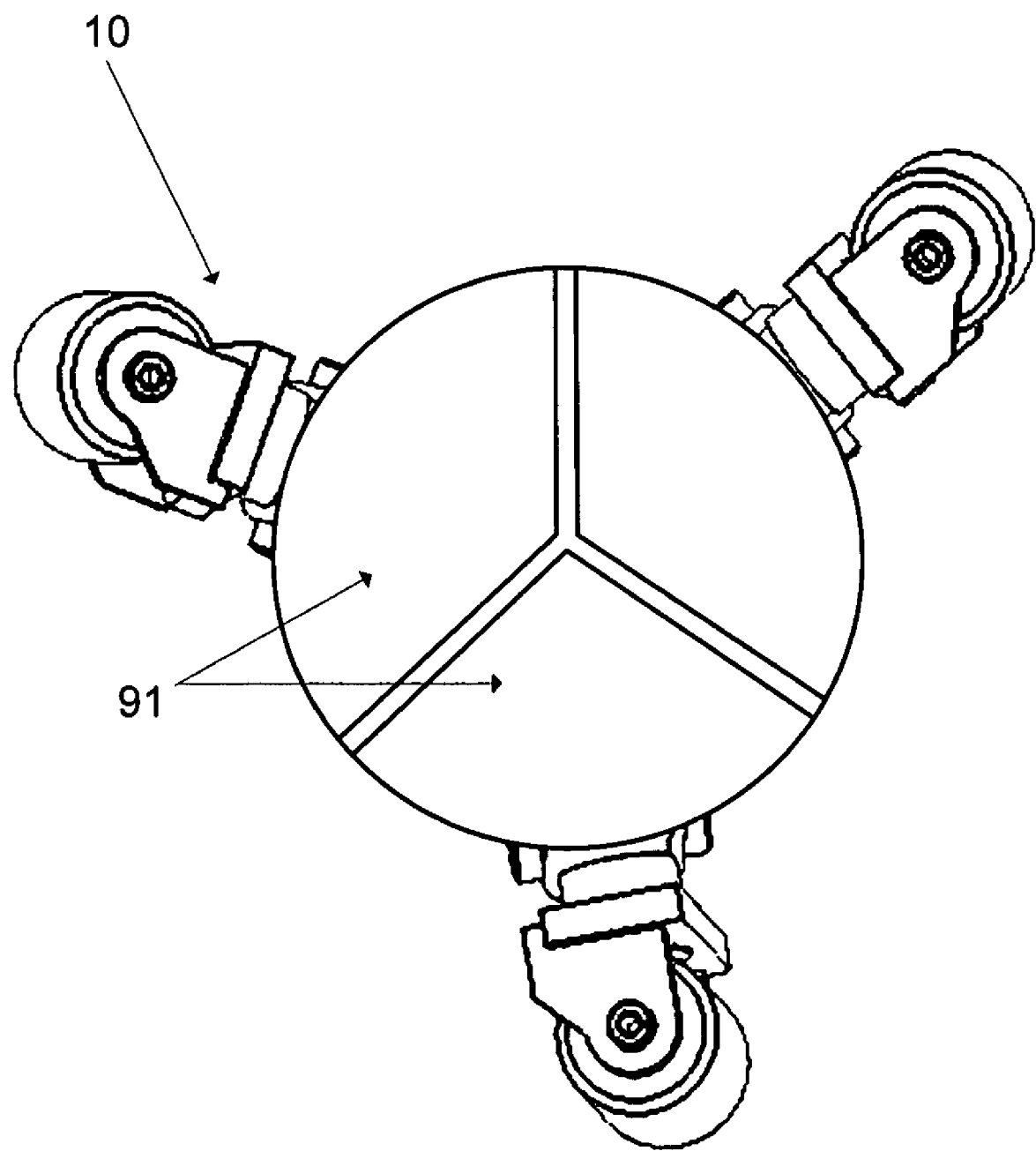
FIG. 20 is a front view of an apparatus of the invention with a set of digging blades installed, shown in a closed position.

As the foregoing description shows, the apparatus of the invention can be used for multiple purposes by changing the attachments provided on the front arm beams. As the need arises during a job of pipe cleaning or stripping, the apparatus can be used to strip a liner, reshape a section of the pipeline that has become distorted, or even pull debris out of the pipeline in situations where the bucket attachment provided in the in the Harr patent publication cited above proves ineffective. For the latter purpose, jaws 86 can be replaced with other accessories such as a set of rounded shovel blades 91 (see FIG. 20) so that the apparatus can be used to excavate soil from a pipeline in a manner similar to a post-hole digger.

The method and apparatus of the invention will most often be used in connection with a pipe relining operation. In most cases, after the line has been cleared, a replacement pipe such as one made of polyethylene will be pulled into the existing pipeline, or one of a number of known relining processes will be used wherein a lining is formed on the inside of the existing pipeline. As part of the method of the invention, a step of relining the pipeline may follow the steps discussed above.

This step may be carried out after or during the steps of the pipe cleaning method. A replacement pipe may be pulled into the pipeline by attaching it to the front of apparatus 10 at jaws 86, which are connected by a cable to swivel bearing joint, shackle and pipe puller such as shown in Wentworth et al. U.S. Pat. No. 7,086,808, the contents of which are incorporated by reference herein. Additional holes to provide connector eyes may be formed as needed in the tips of jaws 86. As apparatus 10 is pulled by the drill string from one end of the pipeline to the other, pausing where necessary to reform or expand the existing pipeline, the replacement pipe advances into the pipeline in front of it.

While this invention has been described with reference to illustrative embodiments, this description is not intended to be construed in a limiting sense. Various modifications and combinations of the illustrative embodiments will be apparent to persons skilled in the art upon reference to the description. Such variations and additions are specifically contemplated to be with the scope of the invention. It is intended that the appended claims encompass any such modifications or embodiments.

The invention claimed is:

1. A method for reforming a ductile underground pipe, comprising:
    inserting a reforming tool into the underground pipe;
    locating the pipe reforming tool at a location to be reformed;
    extending at least two arms ending in rollers of the reforming tool into engagement with the inner periphery of the underground pipe with the rollers in rolling contact with the inner periphery of the underground pipe, which arms push the underground pipe outwardly in a manner effective to change its cross-sectional shape at the location to be reformed;
    spinning the tool so that the rollers roll against the inner periphery of the underground pipe and push outwardly at the same time in a manner to restore the inner periphery of the pipeline at the reformed location to a round profile;
    retracting the arms; and
    then withdrawing the tool from the pipeline.

2. The method of claim 1 wherein the reforming tool is mounted at the distal end of a rod string, the inserting step further comprises extending the rod string into the underground pipe, and the withdrawing step further comprises retracting the rod string from the underground pipe.

3. The method of claim 2, wherein the rod string is advanced and withdrawn inside the pipeline using a directional drilling machine disposed near one end of the pipeline.

4. The method of claim 2, further comprising a moving the reforming tool along the pipeline using the rod string to a second location in need of reforming, and then repeating the extending and retracting steps.

5. The method of claim 1, wherein the arms extend radially and the rollers are mounted at equiangular positions on axles perpendicular to the arms.

6. A method for reforming an underground pipe, comprising:
    inserting a reforming tool into the underground pipe;
    locating the pipe reforming tool at a location to be reformed;
    extending at least two arms of the reforming tool into engagement with the inner periphery of the underground pipe, which arms push the underground pipe outwardly in a manner effective to change its cross-sectional shape at the location to be reformed; then
    retracting the arms; and
    then withdrawing the tool from the pipeline, wherein the arms of the reforming tool are collapsible and connected to a hydraulic cylinder, such that the extending and retracting steps are carried out by actuating the hydraulic cylinder.

7. The method of claim 6, wherein the hydraulic cylinder operates using hydraulic fluid supplied through the rod string.

8. The method of claim 7, wherein hydraulic fluid in the hydraulic cylinder flows through an exhaust port into the pipeline when the spring biases the hydraulic cylinder to a collapsed position.

9. The method of claim 6, wherein a spring biases the hydraulic cylinder to a collapsed position in which the arms are retracted, and pressure from the hydraulic fluid supplied through the rod string overcomes the force of the spring when the arms are extended.

10. The method of claim 6, wherein the arms of the reforming tool are disposed in a radially symmetrical formation about a lengthwise axis of the rerounding tool, which formation is effective to generate opposing forces on the inner periphery of the pipeline effective to push open a partially collapsed wall of the pipeline.

11. The method of claim 6, further comprising a step of pivoting the reforming tool about its lengthwise axis, and then repeating the extending and retracting steps at the location prior to withdrawing the tool from the pipeline.

12. A collapsible rotary apparatus for reforming an underground pipeline, comprising:
    a tubular housing including a rear connector configured for connection to a drill string and a hydraulic cylinder including a cylinder body and an extendable piston;
    at least two collapsible arms mounted on the tubular housing in positions to exert forces in opposing directions on a pipeline interior when the arms are extended;
    linkages that connect each of the arms to the cylinder body and piston so that the arms are extended in response to activation of the hydraulic cylinder; and
    means for returning the arms to a collapsed position following activation of the hydraulic cylinder.

13. The apparatus of claim 12, where each arm comprises front and rear beams joined end to end by a middle pivot.

14. The apparatus of claim 13, wherein the linkages include a front linkage comprising brackets having front pivots mounted thereon which connect the front beam to the cylinder body so that it can pivot in response to movement of the piston.

15. The apparatus of claim 14, wherein the linkages include a rear linkage comprising:
    a sleeve slidably mounted on the outside of the cylinder body,
    a connector mechanically connecting the sleeve to the piston for movement with the piston, and
    brackets having rear pivots mounted thereon which connect the rear beam to the sleeve.

16. The apparatus of claim 12, wherein the returning means includes a relief passage whereby pressure fluid inside the hydraulic cylinder body in a pressure chamber thereof can leak out at a controlled rate, and a spring positioned to bias the piston to an extended position, wherein activation of the hydraulic cylinder fills the pressure chamber with fluid at a pressure sufficient to retract the piston and extend the arms, and deactivation of the hydraulic cylinder allows the spring to overcome the pressure in the pressure chamber and force fluid out of the pressure chamber.

* * * * *